(12) United States Patent
Ikeda et al.

(10) Patent No.: US 8,518,844 B2
(45) Date of Patent: Aug. 27, 2013

(54) DIELECTRIC CERAMIC COMPOSITION AND MONOLITHIC CERAMIC CAPACITOR

(75) Inventors: Jun Ikeda, Nagaokakyo (JP); Shoichiro Suzuki, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 189 days.

(21) Appl. No.: 13/070,570

(22) Filed: Mar. 24, 2011

(65) Prior Publication Data

US 2011/0235236 A1    Sep. 29, 2011

(30) Foreign Application Priority Data

Mar. 29, 2010  (JP) .................................. 2010-074124

(51) Int. Cl.
*C04B 35/468*    (2006.01)
*H01G 4/06*      (2006.01)

(52) U.S. Cl.
USPC .................. 501/138; 501/139; 361/321.4

(58) Field of Classification Search
USPC ................. 501/138, 139; 361/321.4
See application file for complete search history.

(56) References Cited

U.S. PATENT DOCUMENTS

| | | | |
|---|---|---|---|
| 7,396,791 B2* | 7/2008 | Ito et al. ................. | 501/137 |
| 7,678,724 B2 | 3/2010 | Yanagida et al. | |
| 8,059,388 B2* | 11/2011 | Yamazaki et al. ......... | 361/321.4 |
| 8,264,817 B2* | 9/2012 | Nakamura et al. ......... | 361/321.4 |
| 2006/0160692 A1* | 7/2006 | Ito et al. ................. | 501/137 |
| 2007/0284792 A1 | 12/2007 | Yanagida et al. | |
| 2009/0207551 A1 | 8/2009 | Suzuki | |
| 2010/0067171 A1* | 3/2010 | Yamazaki et al. ......... | 361/321.4 |
| 2011/0122541 A1* | 5/2011 | Nakamura et al. ......... | 361/321.4 |

FOREIGN PATENT DOCUMENTS

| | | |
|---|---|---|
| EP | 1 868 218 A2 | 12/2007 |
| JP | 2005194138 A | 7/2005 |
| JP | 2007022820 A | 2/2007 |
| JP | 2007261913 | * 10/2007 |
| JP | 2007331958 A | 12/2007 |
| WO | 2008066140 | * 6/2008 |
| WO | WO-2008-068999 A1 | 6/2008 |

OTHER PUBLICATIONS

Japanese Office Action issued for corresponding JP 2010-074124, dated Jul. 3, 2012 (with English translation).

* cited by examiner

*Primary Examiner* — Karl Group
(74) *Attorney, Agent, or Firm* — Dickstein Shapiro LLP

(57) ABSTRACT

Provided are a dielectric ceramic composition suitable for use in a monolithic ceramic capacitor that is employed in high-temperature environments such cars, and a monolithic ceramic capacitor constituted by using the dielectric ceramic composition. The dielectric ceramic composition has a composition formula of $100(Ba_{1-x}Ca_x)TiO_3+aR_2O_3+bV_2O_5+cZrO_2+dMnO$ (where R is at least one metal element selected from among Y, La, Sm, Eu, Gd, Tb, Dy, Ho, Er, Tm and Yb, and a, b, c and d denote values in terms of moles), and conditions of $0.03 \leq x \leq 0.20$, $0.05 \leq a \leq 3.50$, $0.22 \leq b \leq 2.50$, $0.05 \leq c \leq 3.0$, and $0.01 \leq d \leq 0.30$ are substantially satisfied. The dielectric ceramic layers in the monolithic ceramic capacitor are made of a sintered compact of the dielectric ceramic composition.

19 Claims, 1 Drawing Sheet

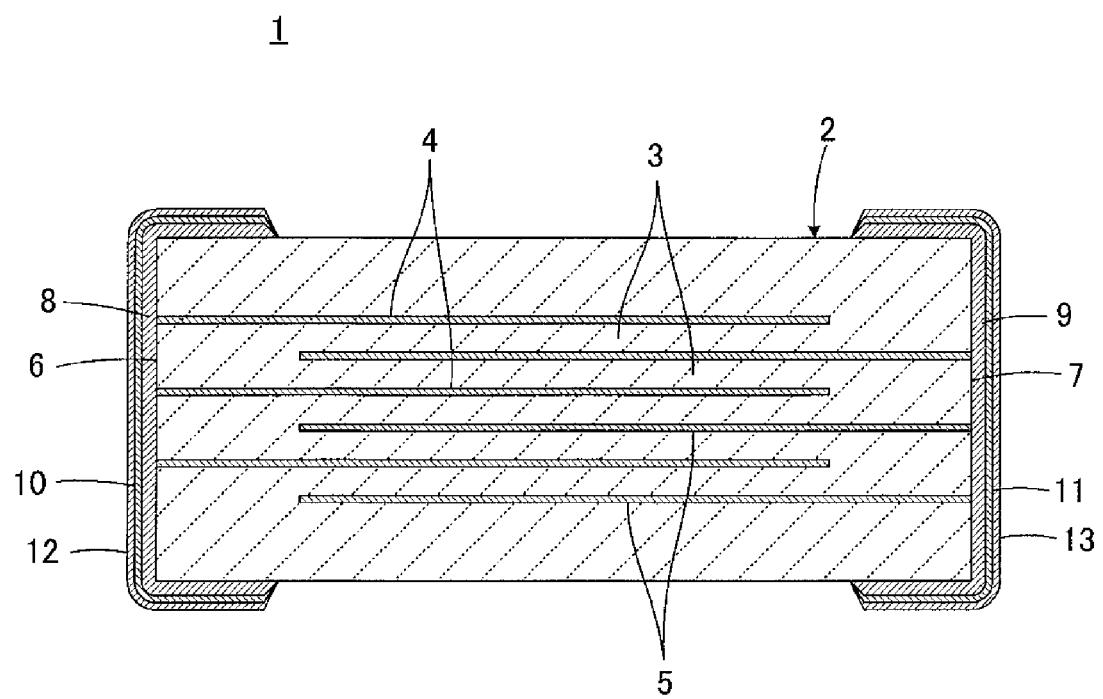

DIELECTRIC CERAMIC COMPOSITION AND MONOLITHIC CERAMIC CAPACITOR

BACKGROUND OF THE INVENTION

1. Field of the Invention

The present invention relates to a dielectric ceramic composition and a monolithic ceramic capacitor. More particularly, the present invention relates to a dielectric ceramic composition suitable for use in a monolithic ceramic capacitor that is employed in high-temperature environments such as in car-mounted equipment, for example, and to the monolithic ceramic capacitor constituted by using the dielectric ceramic composition.

2. Description of the Related Art

Generally, the high-temperature side limit of the guaranteed temperature range for a monolithic ceramic capacitor is set to about 85° C. for ordinary consumer-oriented products and to about 125° C. for products that are required to have higher reliability. However, insulation and reliability (life characteristic) at higher temperatures, i.e., at about 150 to 175° C., have been recently demanded in environments such as cars, etc.

For that reason, a material containing, e.g., $(Ba_{1-x}Ca_x)_m TiO_3$ as a main component, high temperature endurable, and having a good dielectric constant has been employed as a dielectric ceramic composition for such monolithic ceramic capacitor.

Japanese Unexamined Patent Application Publication No. 2005-194138, for example, discloses a dielectric ceramic composition comprising a composition formula of $100(Ba_{1-x}Ca_x)_m TiO_3 + aMnO + bV_2O_5 + cSiO_2 + dRe_2O_3$ (where Re is at least one metal element selected from among Y, La, Sm, Eu, Gd, Tb, Dy, Ho, Er, Tm and Yb, and a, b, c and d denote values in terms of moles), and which substantially satisfy the following conditions:

$$0.030 \leq x \leq 0.20,$$

$$0.990 \leq m \leq 1.030,$$

$$0.010 \leq a \leq 5.0,$$

$$0.050 \leq b \leq 2.5,$$

$$0.20 \leq c \leq 8.0, \text{ and}$$

$$0.050 \leq d \leq 2.5.$$

For the dielectric ceramic composition disclosed in the above-cited Japanese Unexamined Patent Application Publication No. 2005-194138, it is confirmed that the dielectric ceramic composition has excellent high-temperature loading reliability, i.e., about 10 hours or longer in terms of mean time to failure (MTTF), when a DC current having the field strength of about 10 V/μm is applied at about 150° C. However, the above-cited Japanese Unexamined Patent Application Publication No. 2005-194138 does not consider the high-temperature loading reliability, for example, when a DC current having the field strength of about 20 V/μm is applied at about 175° C.

When the amount of the added Re is increased in order to improve the reliability in the dielectric ceramic composition disclosed in the above-cited Japanese Unexamined Patent Application Publication No. 2005-194138, the temperature-dependent change rate of the relative dielectric constant is degraded. It is therefore impossible to realize high reliability and a flat temperature-dependent change rate of the relative dielectric constant simultaneously.

SUMMARY OF THE INVENTION

Accordingly, it is an object of the present invention to provide a dielectric ceramic composition capable of solving the above-described problems, i.e., a dielectric ceramic composition suitable for use in a monolithic ceramic capacitor that is employed in high-temperature environments such as a car, for example.

Another object of the present invention is to provide a monolithic ceramic capacitor constituted by using the dielectric ceramic composition.

To overcome the above-described technical problems, according to a preferred embodiment of the present invention, there is provided a dielectric ceramic composition comprising a composition formula of $100 (Ba_{1-x}Ca_x)TiO_3 + aR_2O_3 + bV_2O_5 + cZrO_2 + dMnO$ (where R is at least one metal element selected from among Y, La, Sm, Eu, Gd, Tb, Dy, Ho, Er, Tm and Yb, and a, b, c and d denote values in terms of moles), and which substantially satisfies the following conditions:

$$0.03 \leq x \leq 0.20,$$

$$0.05 \leq a \leq 3.50,$$

$$0.22 \leq b \leq 2.50,$$

$$0.05 \leq c \leq 3.0, \text{ and}$$

$$0.01 \leq d \leq 0.30.$$

Further, according to a preferred embodiment of the present invention, there is provided a monolithic ceramic capacitor including a capacitor body made up of a plurality of stacked dielectric ceramic layers and a plurality of inner electrodes, the inner electrodes being formed to extend along particular interfaces between the dielectric ceramic layers, and a plurality of outer electrodes formed on outer surfaces of the capacitor body at positions differing from each other and electrically connected to particular ones of the inner electrodes, wherein the dielectric ceramic layers are made of a sintered compact of the dielectric ceramic composition according to the preferred embodiment of the present invention.

With the dielectric ceramic composition according to the preferred embodiment of the present invention, higher reliability, a larger relative dielectric constant, and a smaller temperature-dependent change rate of the relative dielectric constant can be obtained for the sintered compact that is obtained by firing (sintering) the dielectric ceramic composition.

Further, an excellent life characteristic can be obtained in the monolithic ceramic capacitor constituted by using the dielectric ceramic composition according to the preferred embodiment of the present invention, even when a high-temperature loading test is carried out under very severe conditions.

In the dielectric ceramic composition according to the preferred embodiment of the present invention, when the dielectric ceramic composition further contains about 0.2 to 5.0 parts by mole of $SiO_2$ with respect to about 100 parts by mole of the compound represented by $(Ba_{1-x}Ca_x)TiO_3$, a favorable temperature characteristic can be obtained.

In the dielectric ceramic composition according to the preferred embodiment of the present invention, when the dielectric ceramic composition further contains about 0.1 to 5.0 parts by mole of MgO with respect to about 100 parts by mole of the compound represented by $(Ba_{1-x}Ca_x)TiO_3$, higher reliability can be obtained.

Since the dielectric ceramic composition according to the preferred embodiment of the present invention is not changed to a semiconductor state even when it is fired under low partial pressure of oxygen, the inner electrodes in the monolithic ceramic capacitor can be advantageously made of a material containing, as a main component, at least one kind of electroconductive material selected from Ni, a Ni alloy, Cu, and a Cu alloy.

Other features, elements, characteristics and advantages of the present invention will become more apparent from the following detailed description of preferred embodiments of the present invention with reference to the attached drawing.

BRIEF DESCRIPTION OF THE DRAWING

FIG. 1 The sole FIGURE is a sectional view illustrating a monolithic ceramic capacitor constituted by using a dielectric ceramic composition according to an embodiment of the present invention.

DESCRIPTION OF THE PREFERRED EMBODIMENTS

The sole FIGURE is a sectional view illustrating a monolithic ceramic capacitor 1 constituted by using a dielectric ceramic composition according to an embodiment of the present invention.

The monolithic ceramic capacitor 1 includes a capacitor body 2. The capacitor body 2 is made up of a plurality of stacked dielectric ceramic layers 3 and a plurality of inner electrodes 4 and 5, the inner electrodes 4 and 5 being formed to extend along a plurality of particular interfaces between the dielectric ceramic layers 3. The inner electrodes 4 and 5 are formed to extend until reaching an outer surface of the capacitor body 2. Inner electrodes 4 which extends to one end surface 6 of the capacitor body 2 and inner electrodes 5 which extends to the other end surface 7 of the capacitor body 2 are alternately arranged inside the capacitor body 2.

Outer electrodes 8 and 9 are formed on the outer surfaces, specifically the end surfaces 6 and 7, of the capacitor body 2, respectively. As required, first plated layers 10 and 11 each made of Ni, Cu or the like are formed on the outer electrodes 8 and 9, respectively, and second plated layers 12 and 13 each made of solder, Sn or the like are formed on the first plated layers 10 and 11, respectively.

A method of manufacturing the above-described monolithic ceramic capacitor 1 will be described below.

First, a material power for the dielectric ceramic composition is prepared and processed into a state of slurry. The slurry is molded into the form of a sheet, thus obtaining a green sheet for each of the dielectric ceramic layers 3. As the dielectric ceramic material powder, material powder for the dielectric ceramic composition according to the embodiment of the present invention as described in detail later, is used.

Next, the inner electrodes 4 and 5 are formed on respective one principal surface of particular ones of the green sheets. The electroconductive material constituting the inner electrodes 4 and 5 contains, as a main component, at least one conductor selected from among Ni, a Ni alloy, Cu, and a Cu alloy. In particular, the electroconductive material preferably contains Ni or a Ni alloy as the main component. The inner electrodes 4 and 5 are usually formed by a screen printing process or a transfer process with the use of an electroconductive paste containing the above-mentioned electroconductive material. However, the method for forming the inner electrodes 4 and 5 is not limited to those examples, and the inner electrodes may be formed by any one of various suitable methods.

Next, the green sheets each including the inner electrode 4 or 5 and forming the dielectric ceramic layer 3 are stacked in a necessary number, and the stacked green sheets are sandwiched between two green sheet groups each including an appropriate number of green sheets on which the inner electrodes are not formed. A raw capacitor body is obtained by integrating those green sheets through thermal compression bonding.

Next, the raw capacitor body is fired (sintered) at a predetermined temperature in a predetermined reducing atmosphere, whereby the capacitor body 2 after the sintering, illustrated in the sole FIG. 1, is obtained.

Thereafter, the outer electrodes 8 and 9 are formed on the end surfaces 6 and 7 of the capacitor body 2 to be electrically connected to the inner electrodes 4 and 5, respectively. For example, Ni, a Ni alloy, Cu, a Cu alloy, Ag, or an Ag alloy can be used as materials for the outer electrodes 8 and 9. The outer electrodes 8 and 9 are usually formed by coating an electroconductive paste, which is obtained by adding glass frit to metal powder, on both the end surfaces 6 and 7 of the capacitor body 2, and then baking the coated electroconductive paste.

The electroconductive paste used to form the outer electrodes 8 and 9 is usually coated on the capacitor body 2 after the sintering and then baked. However, the electroconductive paste may be coated on the raw capacitor body before the sintering and be baked at the same time when the capacitor body 2 is fired.

Next, Ni, Cu or the like is plated on the outer electrodes 8 and 9 to form the first plated layers 10 and 11 on the outer electrodes 8 and 9, respectively. Finally, solder, Sn or the like is plated on the first plated layers 10 and 11 to form the second plated layers 12 and 13, thereby completing the monolithic ceramic capacitor 1.

In the monolithic ceramic capacitor 1 manufactured as described above, the dielectric ceramic layers 3 are each made of a sintered compact of a dielectric ceramic composition, comprising a composition formula of $100(Ba_{1-x}Ca_x)TiO_3 + aR_2O_3 + bV_2O_5 + cZrO_2 + dMnO$ (where R is at least one metal element selected from among Y, La, Sm, Eu, Gd, Tb, Dy, Ho, Er, Tm and Yb, and a, b, c and d denote values in terms of moles).

In the above composition formula, x, a, b, c and d substantially satisfy the following conditions:

$0.03 \leq x \leq 0.20$, $0.05 \leq a \leq 3.50$, $0.22 \leq b \leq 2.50$, $0.05 \leq c \leq 3.0$, and $0.01 \leq d \leq 0.30$.

Further, while a ratio of (Ba+Ca)/Ti in the above composition formula is usually about 1, it is confirmed that characteristics are not substantially changed even with the ratio varying in the range of about 0.99 to 1.05.

The above-mentioned dielectric ceramic composition can be sintered without being changed to a semiconductive state even when fired under low partial pressure of oxygen, e.g., in a reducing atmosphere.

As seen from Experimental Examples described later, the sintered compact of the above-mentioned dielectric ceramic composition has a large relative dielectric constant and a small temperature-dependent change rate of the relative dielectric constant. By using the above-described dielectric ceramic composition to form the dielectric ceramic layers 3 in the monolithic ceramic capacitor 1, an excellent life characteristic can be obtained even when a high-temperature loading test is carried out under very severe conditions, and the reliability of the monolithic ceramic capacitor 1 can be increased.

Starting materials of the above-mentioned dielectric ceramic composition include a compound represented by $(Ba_{1-x}Ca_x)TiO_3$, an R compound (where R is at least one metal element selected from among Y, La, Sm, Eu, Gd, Tb, Dy, Ho, Er, Tm and Yb), a V compound, a Zr compound, and a Mn compound. However, the material powder of the dielectric ceramic composition can be produced by any one of various suitable methods so long as the compound represented by $100(Ba_{1-x}Ca_x)TiO_3+aR_2O_3+bV_2O_5+cZrO_2+dMnO$ can be obtained.

Given that the compound represented by $(Ba_{1-x}Ca_x)TiO_3$ is called a main component and the other constituents are called accessory components, the material powder of the dielectric ceramic composition can be obtained, for example, by a production method including a step of mixing $BaCO_3$, $CaCO_3$ and $TiO_2$, a step of heat-processing the mixture to synthesize the main component, and a step of mixing the accessory components to and with the synthesized main component.

As an alternative, the material powder of the dielectric ceramic composition may be obtained by a production method including a step of synthesizing the main component by a wet synthesis method, such as the hydrothermal synthesis method, the hydrolysis method, or the sol-gel method, and a step of mixing the accessory components to and with the obtained main component.

The R compound, the V compound, the Zr compound, and the Mn compound used as the accessory components are not limited to oxide powders, and they may be prepared as solutions of alkoxides, organic metals, etc. so long as the dielectric ceramic composition can be formed. The characteristics of the dielectric ceramic composition are not degraded depending on the material form of the accessory components used. After sintering, the form of R, V, Zr and Mn compounds is not limited and compounds containing these elements may be present as such at grain boundaries or the R, V, Zr and Mn may be dissolved in the crystal grains, or both.

In the dielectric ceramic composition according to the embodiment of the present invention, as seen from Experimental Example 2 described later, a better temperature characteristic can be obtained when the dielectric ceramic composition further contains about 0.2 to 5.0 parts by mole of $SiO_2$ with respect to about 100 parts by mole of the compound represented by $(Ba_{1-x}Ca_x)TiO_3$.

Also, higher reliability can be obtained when the dielectric ceramic composition further contains about 0.1 to 5.0 parts by mole of MgO with respect to about 100 parts by mole of the compound represented by $(Ba_{1-x}Ca_x)TiO_3$ as seen from Experimental Example 3 described later.

The above-mentioned dielectric ceramic composition is fired to form the dielectric ceramic layer 3 in the monolithic ceramic capacitor 1, illustrated in the sole FIGURE. In the firing step, a metal, such as Ni, an Ni alloy, Cu, or a Cu alloy, contained in the inner electrodes 4 and 5 may be dispersed into the dielectric ceramic layer 3 in some cases. It is, however, confirmed that when the above-mentioned dielectric ceramic composition is employed, the resultant electrical characteristics are not substantially affected even with the dispersion of such a metal component.

The present invention will be described in more detail below in connection with Experimental Examples. The following Experimental Examples provide the basis for limiting the composition range or the preferable composition range of the dielectric ceramic composition according to the embodiment of the present invention.

In each of Experimental Examples, the monolithic ceramic capacitor 1 illustrated in the sole FIGURE was fabricated as a sample.

Experimental Example 1

First, respective high-purity powders of $BaCO_3$, $CaCO_3$, and $TiO_2$ were prepared as the starting materials of the main component, i.e., $(Ba_{1-x}Ca_x)TiO_3$, and those starting material powders were formulated such that a Ca modification rate x listed in Tables 1 and 2 was obtained.

Next, the formulated starting material powders were wet-mixed by using a ball mill to achieve homogeneous dispersion. A preparative powder was then obtained through drying.

Next, the preparative powder was calcined at temperature from about 1000° C. to 1200° C. to obtain main-component powder having a mean particle diameter of about 0.20 μm. The mean particle diameter was determined by observing the powder with a scanning electron microscope and measuring diameters of 300 particles.

Respective powders of $R_2O_3$ (where R is at least one selected from among Y, La, Sm, Eu, Gd, Tb, Dy, Ho, Er, Tm and Yb), $V_2O_5$, $ZrO_2$ and $MnCO_3$ were prepared as starting materials of the accessory components.

Next, properly mixed powders having the composition represented by the composition formula of $100 (Ba_{1-x}Ca_x)TiO_3+aR_2O_3+bV_2O_5+cZrO_2+dMnO$ was obtained by formulating, with respect to each of the main component powders having the Ca modification rates x listed in Tables 1 and 2, the starting material powders of the accessory components such that mole amounts of a, b, c and d were obtained as listed in Tables 1 and 2 with selection of R as listed therein.

Next, the mixed powders were wet-mixed and homogeneously dispersed using a ball mill. A raw material powder for the dielectric ceramic composition was then obtained through drying.

A slurry containing the dielectric ceramic composition was obtained by adding a polyvinyl butyral-based binder, a plasticizer, and an organic solvent, e.g., ethanol, to the dielectric-ceramic raw material powder, and by wet-mixing the mixture with a ball mill.

Next, the slurry was coated in the form of a sheet over a carrier film made of polyethylene terephthalate, whereby a green sheet containing the dielectric ceramic composition was obtained. The obtained green sheet had a thickness of 2.4 μm.

Thereafter, an inner electrode pattern was printed on the obtained green sheet by using an electroconductive paste containing Ni as a main component. Six of the green sheets were stacked to form six layers such with the inner electrode patterns oppositely positioned to provide electrostatic capacities in plural stages. Further, an appropriate number of ceramic green sheets not including inner electrode patterns are stacked on each of upper and lower surfaces of the six layers. A raw capacitor body was then obtained through thermal compression bonding of the stacked green sheets.

Next, the raw capacitor body was put in a $N_2$ atmosphere and was held at temperature of about 350° C. for about 3 hours to remove the binder. A sintered capacitor body was then obtained by firing the raw capacitor body in a reducing atmosphere in which oxygen partial pressure was set to about $10^{-12}$ to $10^{-9}$ MPa, i.e., to a level not oxidizing Ni contained in the inner electrodes, with the use of mixed gas of $N_2$—$H_2$—$H_2O$.

An electroconductive paste made of Cu as a main component and containing $B_2O_3$—$SiO_2$—BaO-based glass frit was then coated on both end surfaces of the sintered capacitor body and baked in a $N_2$ atmosphere at temperature of about 800° C. Outer electrodes electrically connected to the inner electrodes were thereby formed.

By using known methods, Ni was plated on the outer electrodes to form the first plated layers, and Sn was plated on the first plated layers to form the second plated layers.

The monolithic ceramic capacitor samples thus obtained had external dimensions of a width of about 5.0 mm, a length of about 5.7 mm, and a thickness of about 2.4 mm. The number of effective dielectric ceramic layers was 5, the area of the opposed electrodes per layer was 16.3 mm², and the thickness of the dielectric ceramic layer was 2.0 μm.

The monolithic ceramic capacitor samples obtained were measured for an electrostatic capacity (C) using automatic bridge-type measuring device and by applying an AC voltage of about 1 $V_{rms}$ and about 1 kHz at about 25° C., and for a relative dielectric constant ($\in_r$) from the measured C, the area of the inner electrode, and the thickness of the dielectric ceramic layer.

Further, the electrostatic capacity was measured while the temperature was changed in the range of about −55° C. to 150° C., and a temperature-dependent change rate ($\Delta C_T$) was calculated for the electrostatic capacity ($C_T$), at which an absolute value of the change thereof was maximized, based on a formula of $\Delta C_T = \{(C_T - C_{25})/C_{25}\}$ with the electrostatic capacity ($C_{25}$) at about 25° C. being a reference.

A high-temperature loading reliability test was performed by applying a DC voltage of about 40 V at temperature of about 175° C., and by measuring time-lapse change of insulation resistance value ($R_{LIFE}$). When an insulation resistance value of a sample was reduced to about $10^5 \Omega$ or below, that time was regarded as indicating the occurrence of a failure and a mean time to failure (MTTF) was calculated.

Evaluation results of the above-described electrical characteristics are listed in Tables 1 and 2.

TABLE 1

| Sample No. | 100(Ba$_{1-x}$Ca$_x$)TiO$_3$ + aR$_2$O$_3$ + bV$_2$O$_5$ + cZrO$_2$ + dMnO | | | | | $\in_r$ | $\Delta C_T$ [%] | MTTF [Time] |
|---|---|---|---|---|---|---|---|---|
| | x | R | A | b | c | d | | | |
| 1* | 0.02 | Y | 2.0 | 0.22 | 1.5 | 0.15 | 3340 | −21.5 | 43 |
| 2* | 0.21 | Y | 2.0 | 0.22 | 1.5 | 0.15 | 2730 | −20.3 | 47 |
| 3* | 0.20 | Y | 0.04 | 0.22 | 1.5 | 0.15 | 3200 | −23.5 | 46 |
| 4* | 0.20 | Y | 3.6 | 0.22 | 1.5 | 0.15 | 2450 | −17.3 | 85 |
| 5* | 0.20 | Y | 2.0 | 0.20 | 0.05 | 0.15 | 3340 | −24.2 | 48 |
| 6* | 0.20 | Y | 2.0 | 2.6 | 0.05 | 0.15 | 2330 | −20.3 | 75 |
| 7* | 0.10 | Y | 0.05 | 2.5 | 0.04 | 0.15 | 2650 | −16.7 | 47 |
| 8* | 0.10 | Y | 0.05 | 2.5 | 3.1 | 0.15 | 3410 | −23.4 | 75 |
| 9* | 0.20 | Y | 2.0 | 0.22 | 0.05 | 0.008 | 3050 | −19.2 | 47 |
| 10* | 0.20 | Y | 2.0 | 0.22 | 0.05 | 0.31 | 2940 | −23.4 | 74 |
| 11 | 0.03 | Y | 2.0 | 0.22 | 1.5 | 0.15 | 2650 | −19.8 | 51 |
| 12 | 0.05 | Y | 2.0 | 0.22 | 1.5 | 0.15 | 2770 | −18.6 | 66 |
| 13 | 0.07 | Y | 2.0 | 0.22 | 1.5 | 0.15 | 2650 | −17.5 | 74 |
| 14 | 0.10 | Y | 2.0 | 0.22 | 1.5 | 0.15 | 2610 | −18.2 | 85 |
| 15 | 0.13 | Y | 2.0 | 0.22 | 1.5 | 0.15 | 2740 | −19.4 | 86 |
| 16 | 0.15 | Y | 2.0 | 0.22 | 1.5 | 0.15 | 2860 | −19.7 | 70 |
| 17 | 0.18 | Y | 2.0 | 0.22 | 1.5 | 0.15 | 2830 | −19.6 | 59 |
| 18 | 0.20 | Y | 2.0 | 0.22 | 1.5 | 0.15 | 2620 | −18.2 | 58 |
| 19 | 0.20 | Y | 0.05 | 0.22 | 1.5 | 0.15 | 2950 | −21.1 | 53 |
| 20 | 0.20 | Y | 0.1 | 0.22 | 1.5 | 0.15 | 2950 | −21.2 | 64 |
| 21 | 0.20 | Y | 0.5 | 0.22 | 1.5 | 0.15 | 2840 | −20.9 | 65 |
| 22 | 0.20 | Y | 1.0 | 0.22 | 1.5 | 0.15 | 2750 | −20.0 | 92 |
| 23 | 0.20 | Y | 1.5 | 0.22 | 1.5 | 0.15 | 2640 | −19.4 | 94 |
| 24 | 0.20 | Y | 2.0 | 0.22 | 1.5 | 0.15 | 2800 | −19.2 | 95 |
| 25 | 0.20 | Y | 2.5 | 0.22 | 1.5 | 0.15 | 2750 | −18.5 | 96 |
| 26 | 0.20 | Y | 3.0 | 0.22 | 1.5 | 0.15 | 2650 | −16.7 | 87 |
| 27 | 0.20 | Y | 3.5 | 0.22 | 1.5 | 0.15 | 2600 | −16.5 | 87 |
| 28 | 0.10 | La | 2.0 | 0.22 | 0.05 | 0.15 | 3030 | −20.4 | 54 |
| 29 | 0.10 | Sm | 2.0 | 0.22 | 0.05 | 0.15 | 3025 | −20.1 | 61 |
| 30 | 0.10 | Eu | 2.0 | 0.22 | 0.05 | 0.15 | 3030 | −20.2 | 67 |

TABLE 2

| Sample No. | 100(Ba$_{1-x}$Ca$_x$)TiO$_3$ + aR$_2$O$_3$ + bV$_2$O$_5$ + cZrO$_2$ + dMnO | | | | | $\in_r$ | $\Delta C_T$ [%] | MTTF [Time] |
|---|---|---|---|---|---|---|---|---|
| | x | R | A | b | c | d | | | |
| 31 | 0.10 | Gd | 2.0 | 0.22 | 0.05 | 0.15 | 3050 | −19.4 | 70 |
| 32 | 0.10 | Tb | 2.0 | 0.22 | 0.05 | 0.15 | 3020 | −18.7 | 77 |
| 33 | 0.10 | Dy | 2.0 | 0.22 | 0.05 | 0.15 | 2920 | −17.0 | 81 |
| 34 | 0.10 | Ho | 2.0 | 0.22 | 0.05 | 0.15 | 2810 | −16.2 | 89 |
| 35 | 0.10 | Er | 2.0 | 0.22 | 0.05 | 0.15 | 2750 | −18.9 | 81 |
| 36 | 0.10 | Tm | 2.0 | 0.22 | 0.05 | 0.15 | 2660 | −18.4 | 88 |
| 37 | 0.10 | Yb | 2.0 | 0.22 | 0.05 | 0.15 | 2560 | −19.0 | 92 |
| 38 | 0.20 | Y | 2.0 | 0.22 | 0.05 | 0.15 | 2960 | −20.3 | 63 |
| 39 | 0.20 | Y | 2.0 | 0.30 | 0.05 | 0.15 | 2920 | −20.2 | 62 |
| 40 | 0.20 | Y | 2.0 | 0.50 | 0.05 | 0.15 | 2820 | −20.3 | 65 |
| 41 | 0.20 | Y | 2.0 | 1.0 | 0.05 | 0.15 | 2810 | −19.5 | 71 |
| 42 | 0.20 | Y | 2.0 | 1.5 | 0.05 | 0.15 | 2750 | −18.8 | 74 |
| 43 | 0.20 | Y | 2.0 | 2.0 | 0.05 | 0.15 | 2660 | −17.1 | 82 |
| 44 | 0.20 | Y | 2.0 | 2.5 | 0.05 | 0.15 | 2550 | −16.3 | 89 |
| 45 | 0.10 | Y | 0.05 | 2.5 | 0.05 | 0.15 | 3000 | −18.8 | 53 |
| 46 | 0.10 | Y | 0.05 | 2.5 | 0.1 | 0.15 | 3020 | −18.5 | 68 |
| 47 | 0.10 | Y | 0.05 | 2.5 | 0.5 | 0.15 | 3030 | −19.0 | 79 |
| 48 | 0.10 | Y | 0.05 | 2.5 | 1.0 | 0.15 | 3120 | −20.0 | 95 |
| 49 | 0.10 | Y | 0.05 | 2.5 | 1.5 | 0.15 | 3230 | −21.0 | 90 |
| 50 | 0.10 | Y | 0.05 | 2.5 | 2.0 | 0.15 | 3250 | −21.2 | 85 |
| 51 | 0.10 | Y | 0.05 | 2.5 | 2.5 | 0.15 | 3310 | −21.3 | 88 |
| 52 | 0.10 | Y | 0.05 | 2.5 | 3.0 | 0.15 | 3300 | −21.5 | 95 |
| 53 | 0.20 | Y | 2.0 | 0.22 | 0.05 | 0.01 | 3080 | −19.4 | 61 |
| 54 | 0.20 | Y | 2.0 | 0.22 | 0.05 | 0.02 | 3120 | −19.7 | 59 |
| 55 | 0.20 | Y | 2.0 | 0.22 | 0.05 | 0.05 | 3170 | −19.9 | 65 |
| 56 | 0.20 | Y | 2.0 | 0.22 | 0.05 | 0.10 | 3190 | −20.4 | 77 |
| 57 | 0.20 | Y | 2.0 | 0.22 | 0.05 | 0.15 | 3250 | −20.3 | 75 |
| 58 | 0.20 | Y | 2.0 | 0.22 | 0.05 | 0.20 | 3270 | −21.4 | 90 |
| 59 | 0.20 | Y | 2.0 | 0.22 | 0.05 | 0.25 | 3290 | −21.0 | 84 |
| 60 | 0.20 | Y | 2.0 | 0.22 | 0.05 | 0.30 | 3370 | −21.4 | 85 |

In Table 1, the sample number suffixed with a mark * represents a sample departing from the composition ranges according to the embodiment of the present invention.

The reason why the composition ranges are restricted as described above in the present invention will be described below.

In the case of x being substantially <0.03, the MTTF was shorter than about 50 hours, as in Sample 1. On the other hand, x was substantially >0.20, the MTTF was also shorter than about 50 hours as in Sample 2.

In the case of a being substantially <0.05, the absolute value of $\Delta C_T$ was over about 23%, as in Sample 3. On the other hand, in the case of a being substantially >3.50, the $\in_r$ was smaller than about 2500, as in Sample 4.

When b was substantially <0.22, the absolute value of $\Delta C_T$ was over about 23% and the MTTF was shorter than about 50 hours, as in Sample 5. On the other hand, when b was substantially >2.50, $\in_r$ was smaller than about 2500, as in Sample 6.

In the case of c being substantially <0.05, the MTTF was shorter than about 50 hours, as in Sample 7. On the other hand, when c was substantially >3.0, the absolute value of $\Delta C_T$ was over about 23%, as in Sample 8.

In the case where d was substantially <0.01, the MTTF was shorter than about 50 hours, as in Sample 9. On the other hand, when d was substantially >0.30, the absolute value of $\Delta C_T$ was over about 23%, as in Sample 10.

In contrast, Samples 11 to 60 which satisfy the composition ranges according to the embodiment of the present invention, the $\in_r$ increased to about 2500 or above, the absolute value of $\Delta C_T$ reduced to about 23% or below, and the MTTF prolonged to 50 hours or longer.

Experimental Example 2

In Experimental Example 2, the effect of addition of $SiO_2$ was examined.

A powder of $SiO_2$ was further prepared as one of the starting materials of the accessory components. Then, monolithic ceramic capacitors samples were prepared through similar operations to those in Experimental Example 1 except that properly mixed powder having composition represented by a composition formula of $100(Ba_{1-x}Ca_x)TiO_3 + aR_2O_3 + bV_2O_5 + cZrO_2 + dMnO + eSiO_2$ was obtained by formulating, with respect to the main component powder having the Ca modification rate x indicated in Table 3, the starting material powders of the accessory components such that mole amounts of a, b, c, d and e were obtained as listed in Table 3 with selection of Y as R.

Further, the temperature-dependent change rate ($\Delta C_T$) was measured for the monolithic ceramic capacitor corresponding to each sample in a similar manner to that described above in Experimental Example 1. The measured results are listed in Table 3.

TABLE 3

| Sample | $100(Ba_{1-x}Ca_x)TiO_3 + aR_2O_3 + bV_2O_5 + cZrO_2 + dMnO + eSiO_2$ | | | | | | $\Delta C_T$ |
|---|---|---|---|---|---|---|---|
| No. | x | R | a | b | c | d | e | [%] |
| 61 | 0.05 | Y | 0.05 | 0.22 | 3.0 | 0.15 | 0.1 | −16.5 |
| 62 | 0.05 | Y | 0.05 | 0.22 | 3.0 | 0.15 | 0.2 | −14.3 |
| 63 | 0.05 | Y | 0.05 | 0.22 | 3.0 | 0.15 | 1.0 | −14.0 |
| 64 | 0.05 | Y | 0.05 | 0.22 | 3.0 | 0.15 | 1.5 | −13.9 |
| 65 | 0.05 | Y | 0.05 | 0.22 | 3.0 | 0.15 | 2.0 | −13.6 |
| 66 | 0.05 | Y | 0.05 | 0.22 | 3.0 | 0.15 | 2.5 | −12.3 |
| 67 | 0.05 | Y | 0.05 | 0.22 | 3.0 | 0.15 | 3.0 | −12.4 |
| 68 | 0.05 | Y | 0.05 | 0.22 | 3.0 | 0.15 | 4.0 | −13.5 |
| 69 | 0.05 | Y | 0.05 | 0.22 | 3.0 | 0.15 | 5.0 | −14.2 |
| 70 | 0.05 | Y | 0.05 | 0.22 | 3.0 | 0.15 | 5.2 | −15.3 |

Comparing with Samples 11 to 60 which satisfy the composition ranges according to the embodiment of the present invention listed in Tables 1 and 2, the absolute value of $\Delta C_T$ was reduced in all of Samples 61 to 70 listed in Table 3. In particular, the absolute value of $\Delta C_T$ was reduced to about 15% or below and a better temperature characteristic was obtained in Samples 62 to 69 in which the amount e of added $SiO_2$ was in the range of about 0.2 to 5.0 parts by mole.

Experimental Example 3

In Experimental Example 3, the effect of addition of MgO was examined.

A $MgCO_3$ powder was further prepared as an accessory component starting material. Then, monolithic ceramic capacitors samples were prepared through similar operations to those in Experimental Example 1 except that properly mixed powder having composition represented by a composition formula of $100(Ba_{1-x}Ca_x)TiO_3 + aR_2O_3 + bV_2O_5 + cZrO_2 + dMnO + fMgO$ was obtained by formulating, with respect to the main component powder having the Ca modification rate x indicated in Table 4, the starting material powders of the accessory components such that mole amounts of a, b, c, d and f as listed in Table 4 with selection of Y as R were obtained.

Further, the mean time to failure (MTTF) was measured for the monolithic ceramic capacitor corresponding to each sample by performing the high-temperature loading reliability test in a similar manner to that described above in Experimental Example 1. The measured results are listed in Table 4.

TABLE 4

| Sample | $100(Ba_{1-x}Ca_x)TiO_3 + aR_2O_3 + bV_2O_5 + cZrO_2 + dMnO + fMgO$ | | | | | | MTTF |
|---|---|---|---|---|---|---|---|
| No. | x | R | a | b | c | d | f | [Time] |
| 71 | 0.03 | Y | 0.05 | 0.22 | 1.5 | 0.15 | 0.08 | 89 |
| 72 | 0.03 | Y | 0.05 | 0.22 | 1.5 | 0.15 | 0.10 | 105 |
| 73 | 0.03 | Y | 0.05 | 0.22 | 1.5 | 0.15 | 0.50 | 120 |
| 74 | 0.03 | Y | 0.05 | 0.22 | 1.5 | 0.15 | 1.0 | 135 |
| 75 | 0.03 | Y | 0.05 | 0.22 | 1.5 | 0.15 | 2.0 | 120 |
| 76 | 0.03 | Y | 0.05 | 0.22 | 1.5 | 0.15 | 3.0 | 120 |
| 77 | 0.03 | Y | 0.05 | 0.22 | 1.5 | 0.15 | 4.0 | 110 |
| 78 | 0.03 | Y | 0.05 | 0.22 | 1.5 | 0.15 | 5.0 | 105 |
| 79 | 0.03 | Y | 0.05 | 0.22 | 1.5 | 0.15 | 5.1 | 95 |

All of Samples 71 to 79 listed in Table 4 exhibited long MTTFs of 89 hours or longer. Particularly, the MTTFs were over 100 hours and more excellent reliability was obtained in Samples 72 to 78 in which the amount f of added MgO was in the range of about 0.1 to 5.0 parts by mole.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A dielectric ceramic composition consisting essentially of a composition having a composition formula of $100(Ba_{1-x}Ca_x)TiO_3 + aR_2O_3 + bV_2O_5 + cZrO_2 + dMnO$ where R is at least one metal element selected from the group consisting of Y, La, Sm, Eu, Gd, Tb, Dy, Ho, Er, Tm and Yb, and a, b, c and d denote values in terms of moles, and which substantially satisfy:

$0.03 \leq x \leq 0.20$, $0.05 \leq a \leq 3.50$, $0.22 \leq b \leq 2.50$, $0.05 \leq c \leq 3.0$, and $0.01 \leq d \leq 0.30$.

2. The dielectric ceramic composition according to claim 1, wherein the dielectric ceramic composition further contains about 0.2 to 5.0 parts by mole of $SiO_2$ with respect to about 100 parts by mole of $(Ba_{1-x}Ca_x)TiO_3$.

3. The dielectric ceramic composition according to claim 2, wherein the dielectric ceramic composition further contains about 0.1 to 5.0 parts by mole of MgO with respect to about 100 parts by mole of $(Ba_{1-x}Ca_x)TiO_3$.

4. The dielectric ceramic composition according to claim 3, wherein $0.05 \leq x$, $0.1 \leq a \leq 3$, $0.3 \leq b$, $0.1 \leq c$, and $0.02 \leq d \leq 0.25$.

5. The dielectric ceramic composition according to claim 4, the amount of $SiO_2$ is at least about 1 part by mole with respect to about 100 parts by mole of $(Ba_{1-x}Ca_x)TiO_3$.

6. The dielectric ceramic composition according to claim 1, wherein the dielectric ceramic composition further contains about 0.1 to 5.0 parts by mole of MgO with respect to about 100 parts by mole of $(Ba_{1-x}Ca_x)TiO_3$.

7. The dielectric ceramic composition according to claim 6, wherein $0.05 \leq x$, $0.1 \leq a \leq 3$, $0.3 \leq b$, $0.1 \leq c$, and $0.02 \leq d \leq 0.25$.

8. A monolithic ceramic capacitor comprising:
a capacitor body comprising a plurality of stacked dielectric ceramic layers and a plurality of inner electrodes, each inner electrodes disposed at a interfaces between adjacent dielectric ceramic layers; and
at least two spaced outer electrodes disposed on an outer surface of the capacitor body electrically connected to different inner electrodes,
wherein the dielectric ceramic layers are a sintered compact of the dielectric ceramic composition according to claim 6.

9. The dielectric ceramic capacitor according to claim 8, wherein the inner electrodes comprise at least one kind electroconductive material selected from the group consisting of Ni, a Ni alloy, Cu, and a Cu alloy.

10. A monolithic ceramic capacitor comprising:
a capacitor body comprising a plurality of stacked dielectric ceramic layers and a plurality of inner electrodes, each inner electrodes disposed at a interfaces between adjacent dielectric ceramic layers; and
at least two spaced outer electrodes disposed on an outer surface of the capacitor body electrically connected to different inner electrodes,
wherein the dielectric ceramic layers are a sintered compact of the dielectric ceramic composition according to claim 5.

11. The dielectric ceramic capacitor according to claim 10, wherein the inner electrodes comprise at least one kind electroconductive material selected from the group consisting of Ni, a Ni alloy, Cu, and a Cu alloy.

12. A monolithic ceramic capacitor comprising:
a capacitor body comprising a plurality of stacked dielectric ceramic layers and a plurality of inner electrodes, each inner electrodes disposed at a interfaces between adjacent dielectric ceramic layers; and
at least two spaced outer electrodes disposed on an outer surface of the capacitor body electrically connected to different inner electrodes,
wherein the dielectric ceramic layers are a sintered compact of the dielectric ceramic composition according to claim 4.

13. The dielectric ceramic capacitor according to claim 12, wherein the inner electrodes comprise at least one kind electroconductive material selected from the group consisting of Ni, a Ni alloy, Cu, and a Cu alloy.

14. A monolithic ceramic capacitor comprising:
a capacitor body comprising a plurality of stacked dielectric ceramic layers and a plurality of inner electrodes, each inner electrodes disposed at a interfaces between adjacent dielectric ceramic layers; and
at least two spaced outer electrodes disposed on an outer surface of the capacitor body electrically connected to different inner electrodes,
wherein the dielectric ceramic layers are a sintered compact of the dielectric ceramic composition according to claim 3.

15. The dielectric ceramic composition according to claim 14, wherein the inner electrodes comprise at least one kind electroconductive material selected from the group consisting of Ni, a Ni alloy, Cu, and a Cu alloy.

16. A monolithic ceramic capacitor comprising:
a capacitor body comprising a plurality of stacked dielectric ceramic layers and a plurality of inner electrodes, each inner electrodes disposed at a interfaces between adjacent dielectric ceramic layers; and
at least two spaced outer electrodes disposed on an outer surface of the capacitor body electrically connected to different inner electrodes,
wherein the dielectric ceramic layers are a sintered compact of the dielectric ceramic composition according to claim 2.

17. The dielectric ceramic composition according to claim 16, wherein the inner electrodes comprise at least one kind electroconductive material selected from the group consisting of Ni, a Ni alloy, Cu, and a Cu alloy.

18. A monolithic ceramic capacitor comprising:
a capacitor body comprising a plurality of stacked dielectric ceramic layers and a plurality of inner electrodes, each inner electrodes disposed at a interfaces between adjacent dielectric ceramic layers; and
at least two spaced outer electrodes disposed on an outer surface of the capacitor body electrically connected to different inner electrodes,
wherein the dielectric ceramic layers are a sintered compact of the dielectric ceramic composition according to claim 1.

19. The dielectric ceramic composition according to claim 18, wherein the inner electrodes comprise at least one kind electroconductive material selected from the group consisting of Ni, a Ni alloy, Cu, and a Cu alloy.

* * * * *